(12) United States Patent
Lohss

(10) Patent No.: US 6,672,727 B1
(45) Date of Patent: Jan. 6, 2004

(54) MOTORIZED VEHICLE MIRROR ACTUATOR

(75) Inventor: Kurt L. Lohss, Pentwater, MI (US)

(73) Assignee: Rami-Vision System, LLC, Mt. Pleasant, SC (US)

( * ) Notice: Subject to any disclaimer, the term of this patent is extended or adjusted under 35 U.S.C. 154(b) by 0 days.

(21) Appl. No.: 09/806,621

(22) PCT Filed: Apr. 13, 1999

(86) PCT No.: PCT/US99/08152

§ 371 (c)(1),
(2), (4) Date: Mar. 28, 2002

(87) PCT Pub. No.: WO00/62111

PCT Pub. Date: Oct. 19, 2000

Related U.S. Application Data

(60) Provisional application No. 60/081,548, filed on Apr. 13, 1998.

(51) Int. Cl.[7] ................................................. G02B 7/18
(52) U.S. Cl. ....................... 359/843; 359/844; 359/871; 359/872
(58) Field of Search ................................. 359/843, 844, 359/871, 872, 877, 601, 602, 603, 606; 248/477, 479

(56) References Cited

U.S. PATENT DOCUMENTS

| | | | | |
|---|---|---|---|---|
| 5,745,310 A | * | 4/1998 | Mathieu | 359/843 |
| 5,886,838 A | * | 3/1999 | Kuramoto | 359/841 |
| 6,076,947 A | * | 6/2000 | Miller | 362/492 |
| 6,109,755 A | * | 8/2000 | Duroux et al. | 359/841 |
| 6,116,742 A | * | 9/2000 | Ahn | 359/843 |
| 6,142,638 A | * | 11/2000 | Zemel et al. | 359/601 |
| 6,364,494 B1 | * | 4/2002 | Kling et al. | 359/601 |
| 6,511,188 B2 | * | 1/2003 | Kling et al. | 359/603 |

* cited by examiner

Primary Examiner—Mohammad Sikder
(74) Attorney, Agent, or Firm—Lynn E. Cargill

(57) ABSTRACT

A motorized mirror actuator is disclosed which includes a movable ramp having upwardly facing angled surfaces for urging a cam element in and out of the normal viewing position, thereby moving the rear view mirror into a position which will enable the driver to see his blind spot. A small electric motor is sufficient to drive the mirror in and out of the appropriate angle for viewing the "blind spot" for the driver of the vehicle.

11 Claims, 6 Drawing Sheets

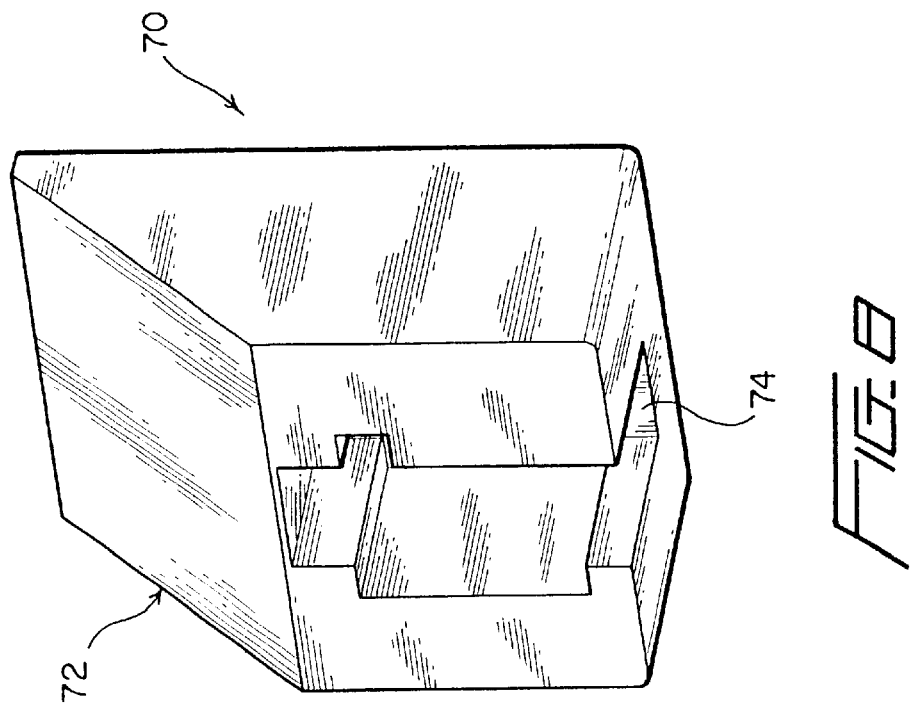
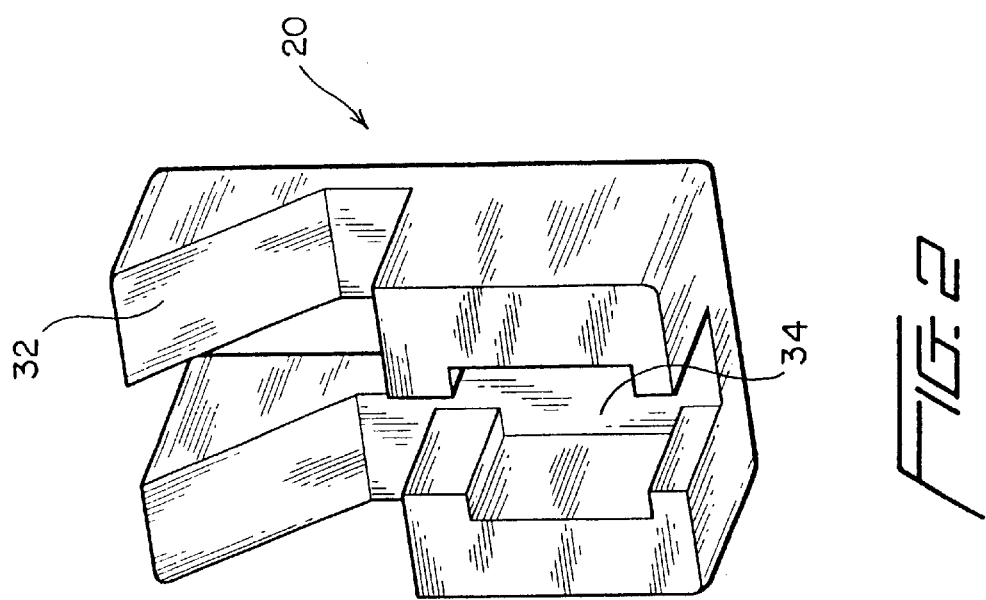

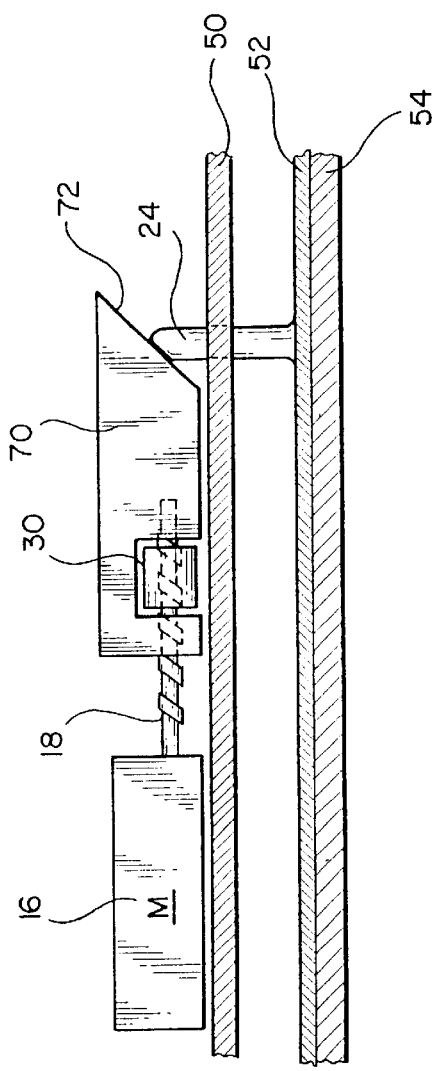
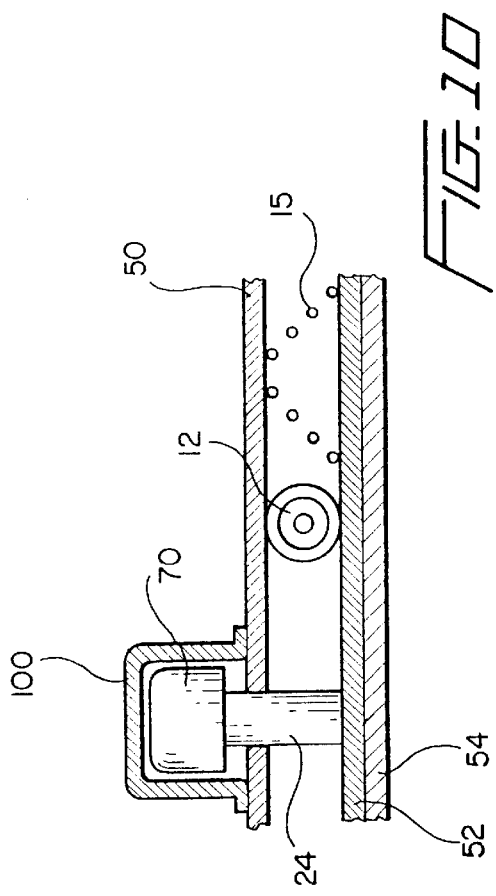

MOTORIZED VEHICLE MIRROR ACTUATOR

This application claims the benefit of provisional application No. 60/081,548 filed Apr. 13, 1998.

This invention relates generally to a vehicle mirror actuator, and more particularly relates to a motor actuator to adjust the reflective surface of an adjustable vehicle mirror designed to reduce the effects of blind spots in the viewing field of a vehicle driver.

BACKGROUND OF THE INVENTION

Problems with seeing objects and/or pedestrians located within the blind spots out of rearview mirrors are well known to drivers. The knowledge of what is located in the "blind spot" of a driver must be learned by movement of the head in combination with looking in the side mounted and windshield mounted rearview mirrors. In order to utilize the same mirror for normal viewing as for blind spot viewing, the mirror must be adjustable. However, conventional adjustable mirrors are four-way mirrors on dual-orthogonality axes, i.e. mirrors that can focus right and left, or up and down. Regrettably, these mirrors are designed to be merely adjustable to accommodate various sizes of drivers. All drivers must be accommodated, and it is well known that men and women are generally of different sizes, so the mirrors need to be adjusted for different drivers.

However, these adjustment mechanisms do nothing to alleviate the problem of viewing the "blind spot". There have been a few proposed solutions for automatically momentarily focusing a rearview mirror to visually cover the entire field of sight, including the "blind spot". In order to effect such an adjustment, some solenoid adjustment systems have been constructed to temporarily adjust a second mirror or the regularly used side mounted rear view mirror to view the blind spot. But they were not absolutely effective to automatically adjust for blind spot sight because they caused vibration of the reflecting surface. The driver would have to look through a "bouncy" mirror, which would not give a perfect reflection of the blind spot.

Such prior art attempts to overcome the problem with viewing "blind spots" have included, among many others, U.S. Pat. No. 5,189,561 issued to Hong on Feb. 23, 1993 which discloses an automatic oscillating vehicle side mirror utilizing a solenoid with an operating lever to actuate the movement of the mirror for the elimination of a blind spot; and U.S. Pat. No. 5,159,497 issued to Lynas on Oct. 27, 1992 which also discloses a rearview mirror for covering the blind spot, although it is also actuated by a solenoid. Both of these prior art patents disclose actuator systems that inherently introduce an element of vibration to the mirror which is undesirable. Other attempts have tried the use of separate mirrors, i.e. U.S. Pat. No. 5,052,792, issued Oct. 1, 1991 to McDonough, which discloses a solenoid actuator means for positioning a second mirror to cover the "blind spot" prior to or during lane changes, turns, or backing maneuvers.

It would therefore be desirable to provide an actuation mechanism for the side-mounted rearview mirror which could momentarily and reliably shift the focus of the rearview mirror into the blind spot without vibration, followed by returning to the normal rearwardly focused position for continuous driving.

It would also be desirable to provide such an actuation mechanism that utilized as few parts as possible, in order to render the manufacturing process to be as simple as possible, with few parts to fail.

SUMMARY OF THE INVENTION

In accordance with the present invention, there is disclosed an electrically driven motorized rearview mirror actuator for a mirror designed to alleviate "blind spots". The present actuator provides substantially vibration-free movement between the normal driving position and that of a blind spot viewing position for the rearview mirror. The present motorized mirror actuator is made with a relatively few number of parts which will resist a lifetime of movements without wearing out. The present actuator is also a separate actuation means from the standard mirror adjuster which would adjust the mirror from left to right or up and down to accommodate differently sized passengers. Rather, the present actuator is its own actuation means used to rotate the rearview mirror about an axis of rotation which is at a predetermined angle from the normal driving position.

In the preferred embodiment, the return of the mirror to its normal position is accomplished without the use of additional motors. This is a great advantage over the prior art. Rather, by the utilization of a well placed spring mechanism, the mirror is returned automatically after being moved into position by the electrically driven motor actuator. Moreover, a delay timer or any other feasible means for timing the action may be used to assure that the mirror is automatically returned to its normal driving position after the driver has had a sufficient amount of time to view the blind spot. The return should generally be accomplished within a time period of between about one second and about three seconds.

By utilizing an adjustable positioning mechanism, a conventional singular rear view mirror plate attached to the motorized mirror actuator in accordance with the present invention will move the mirror plate within the rear view mirror housing temporarily between the normal rear view mirror position as desired by the operator of the vehicle, and a preselected "blind spot" position to increase safety of operation. As disclosed in prior art patents, the actuation may be activated by the turn signal, or any other feasible means. If my motorized mirror actuator is in electrical communication with the turn signal, then the problem of viewing the "blind spot" when making a lane change or turn is automatically covered, as the driver will activate the "blind spot" mirror position as soon as he turns on his turn signal. If the driver wants to turn to the left, then the left side would be activated, while the right mirror would be activated during a turn to the right. Needless to say, there are many more ways to effectively activate my actuator, including buttons, levers or knobs located within easy reach of the driver. The trigger mechanism can be anything that works well. The activation means may include a switch on the steering column.

Having briefly summarized the invention, it will now be described in greater detail hereinbelow, in the context of the appendant drawings. It is to be noted that the scope of the invention shall only be limited by the appended claims. It is also to be noted that the appended drawings illustrate only typical embodiments of the present invention and are therefore not to be considered limiting of its scope, for the invention may admit to other equally fine and effective embodiments.

BRIEF DESCRIPTION OF THE DRAWINGS

FIG. 2 is a perspective view of a movable ramp made in accordance with the present invention;

FIG. 8 is a perspective view of another embodiment of the movable ramp;

FIG. 9 is a side view of the second embodiment of the present invention as shown in FIGS. 7 and 8;

FIG. 10 is an end view of the same embodiment as FIG. 9;

DETAILED DESCRIPTION OF THE INVENTION

Figure 1:
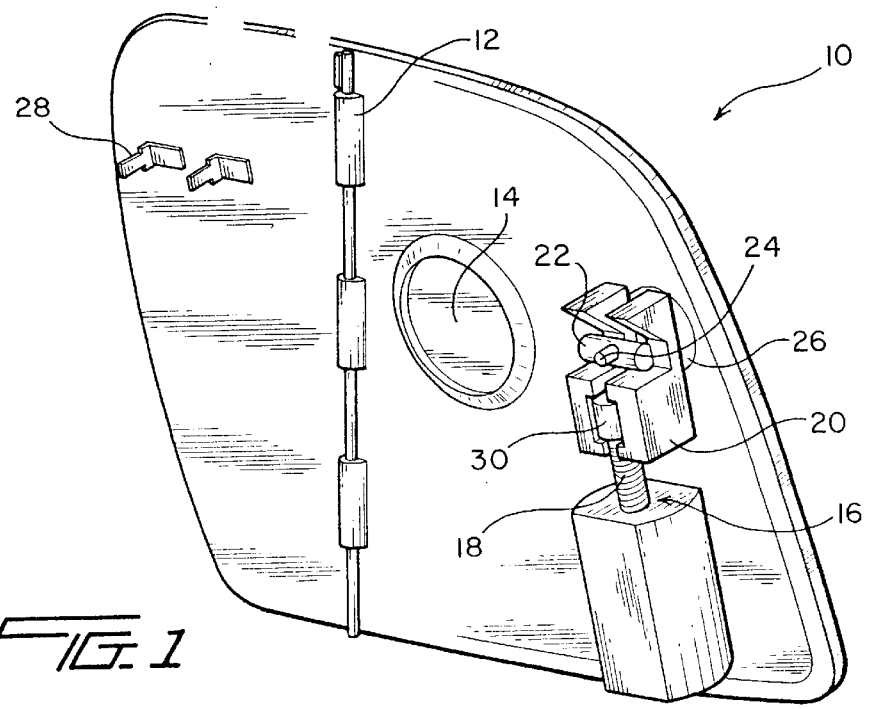
FIG. 1 is a movable mirror base shown in a perspective view.

In accordance with the present invention, one of the preferred embodiments is shown in FIGS. 1 through 4, using like numbers for the same parts in all the drawings. Looking first to FIG. 1, there is shown a movable mirror base generally denoted by the numeral 10 including an integral hinge 12. A spring locator indentation 14 is shown here as a receptor for a beehive spring, although there are many different types of springs which are useful for this purpose. Motor 16 is shown having an elongated jackscrew 18 extending therefrom as being engagingly connected to driver nut 30 which is located within the guideway of movable ramp 20. T-end 22 is attached to T-bar extension 24 to form a cam element T-bar. The T-bar may be permanently affixed or formed out of the movable mirror base place. The T-bar cammingly communicates with the guideway of the movable ramp. The T-bar slides up and down against the upwardly facing angled or inclined surfaces, which acts to move the mirror in and out of the normal viewing position. As will be seen later with reference to other Figures, the mirror base may be automatically returned to the normal viewing position by a spring located close to the hinge. The hinge (not shown in this Figure) is received in the spring locator indentation and is preferably close to the hinge for two reasons. The first reason is because it minimizes vibration from the hinge and the second reason is because it returns the motor. A boot 26 may be used to help dampen vibration and is illustrated behind the movable ramp 20. Boot 26 also acts to surround the T-bar extension 24. Optional heater elements 28 are shown on the back of the base, and may be connected to the remainder of the heater element assembly.

Looking now to FIG. 2, there is shown a perspective view of one of the preferred embodiments of the movable ramp generally denoted by the numeral 20. Movable ramp 20 includes an upwardly facing angled or inclined surface 32 upon which the T-bar (shown in FIG. 1) will ride up and down. Further shown is the guideway 34 which receives the driver nut (again shown in FIG. 1). The preferred angle for the inclined surface is 45°, although other angles are feasible. The angle of 45° is especially preferred, though, because this angle allows for a 1:1 relationship, which allows the use of a single spring to return the mirror base. This means that the motor does not need to be reversible, thereby minimizing parts used in the manufacture. Additional motors or a reversible motors may also be used.

Figure 3:
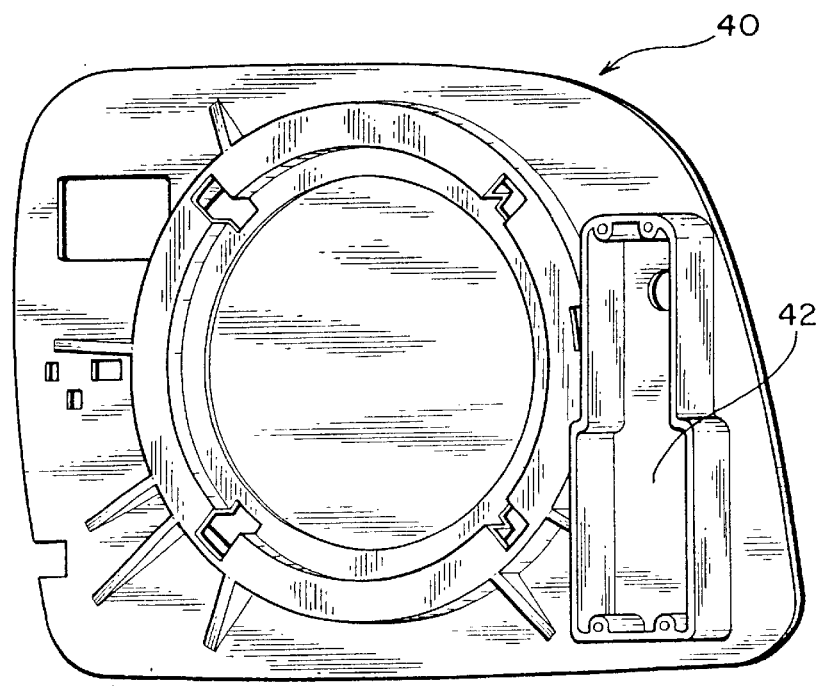
FIG. 3 is a front elevational view of a front stationary actuator plate.
Figure 4:
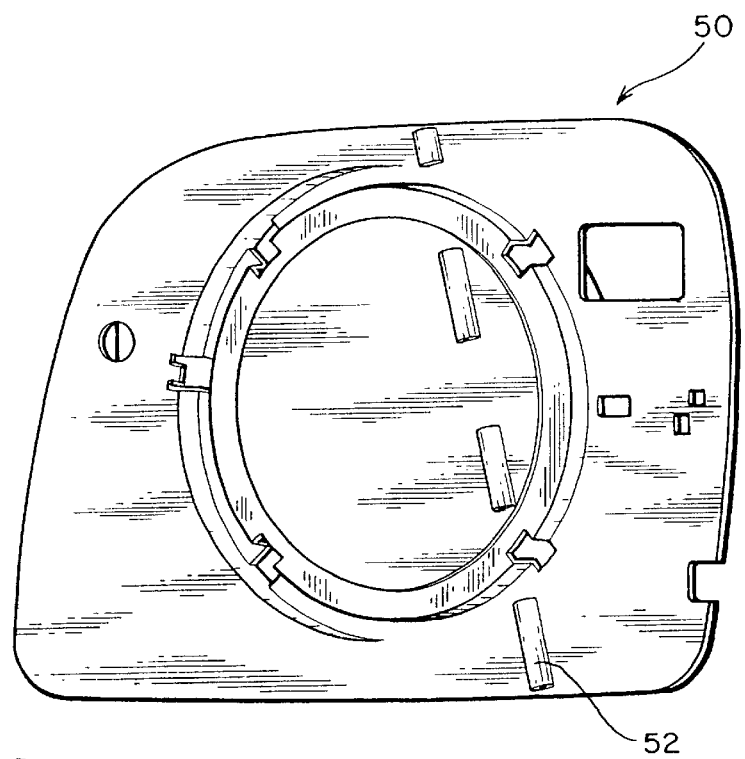
FIG. 4 is a front elevational view of a back stationary actuator plate.

Referring now to FIG. 3, there is shown a stationary actuator front plate generally shown as numeral 40. A motor recess 42 is shown for housing the motor extending outwardly from the mirror base 10 as illustrated in FIG. 1. The concentric circular indentations act to mate with similar indentations in the other half of the "clamshell" as shown in the yet to be discussed FIG. 4. FIG. 4 shows the stationary actuator back plate 50, which is designed to mate to the front plate. Hinge protrusions 52 interconnect with the hinge protrusions of FIG. 2, and a hinge pin is dropped between the two sets of hinge protrusions to yield the hinge necessary for rotating the mirror on its axis.

Rotation about the hinge formed by the hinge protrusions of the mirror base 10 of FIG. 1, along with the hinge protrusions 52 of the stationary actuator back plate 50 of FIG. 4, works to move the mirror from a normal viewing position to that at the "blind spot" viewing position. The angle of the hinge is from about 1° to about 10° off vertical, although the most preferred and effective angle appears to be about 7° off vertical. Of course, with another mirror configuration, other angles would be more feasible.

Figure 5:
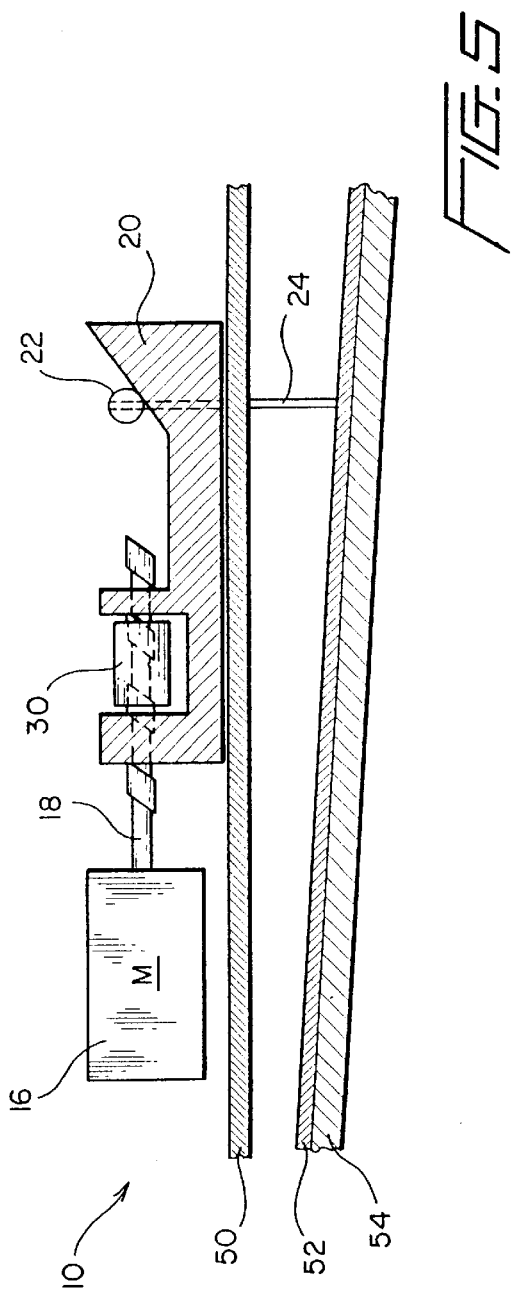
FIG. 5 is a side view of one of the embodiments of the actuation mechanism.
Figure 6:
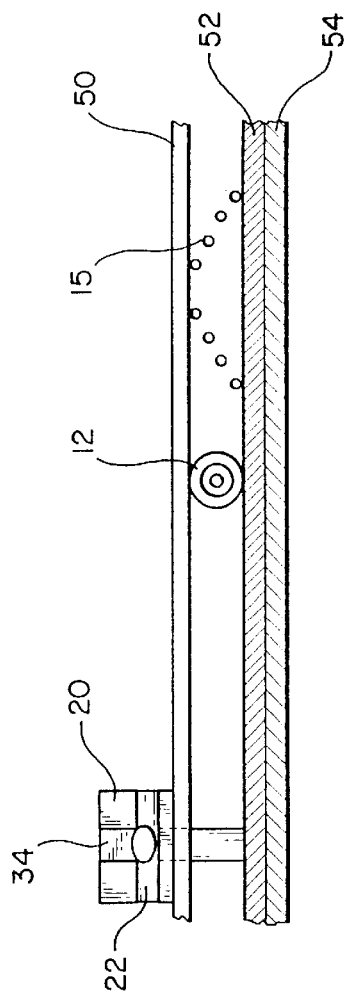
FIG. 6 is an end view of the mechanism in accordance with FIG. 5.

FIG. 5 is a side view of the entire assembled mirror base 10, and illustrates the relative positions of the motor 16, jackscrew 18, and the movable ramp 20. The T-end driver 22 is shown connected to the T-driver bar extension 24. The driver nut 30 moves up and down on the jackscrew 18 which, in turn, moves the movable ramp 20. As the movable ramp is pulled downwardly, i.e. toward the motor 16, by the cam relationship between jackscrew 18 and nut 30, the T-end driver 22 is drawn up the ramp, which essentially pushes down the mirror glass 54 and the mirror base 52 to which it is attached. FIG. 6 shows an end view of FIG. 5, in which it can be seen that ramp 20 works with the driver 22 as it is being guided by guideway 34. Hinge 12 is shown near spring 15, which in this case is a beehive spring.

Figure 7:
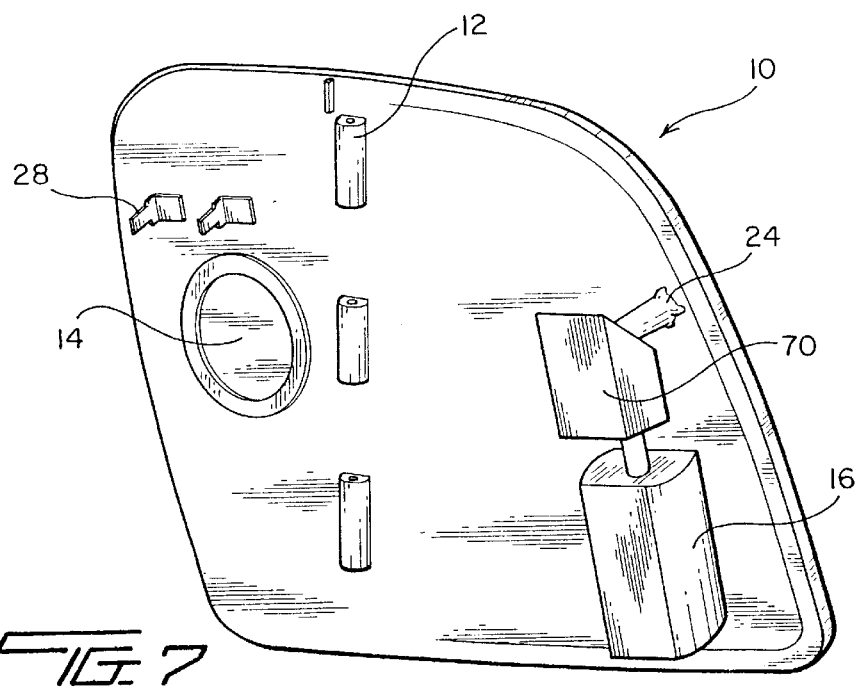
FIG. 7 is a perspective view of another embodiment of this invention.

FIG. 7 shows yet another embodiment of the same invention, although it can be seen from the drawing that the movable ramp has been turned around, such that the upwardly facing inclined surface is facing toward the mirror base plate, rather than away from it. The new movable ramp 70 is shown with the T-driver bar riding on the surface on the inside between the ramp 70 and the T-driver bar extension.

FIG. 8 illustrates the new movable ramp discussed in FIG. 7, generally denoted by numeral 70, in which an upwardly facing inclined surface 72 is also on the diagonal similar to the movable ramp of FIGS. 1 and 2, discussed above. Similarly, the appropriate angles may be the same as described above. Also similarly, a nut driver guideway 74 is shown recessed within the movable ramp 70 for working cooperatively with the driver nut 30.

FIG. 9 shows a side view of the embodiment shown in FIGS. 7 and 8. As can be seen from the drawing, motor 16 rotates jackscrew 18 within driver nut 30, which is in turn held within guideway 74 of movable ramp 70. This urges inclined surface 72 against the tip of the T-driver bar extension 24, thereby pushing away the mirror base 52 and mirror glass 54. FIG. 10 shows an end view of the embodiment of FIG. 9, and illustrates the location of the spring 15 with relation to the hinge 12. The mirror base 52 and the attached mirror glass plate 54 will be returned by the spring 15 toward the actuator plate 50. Movable ramp 70 is shown in a slidably connected situation under cover 100.

Figure 11:
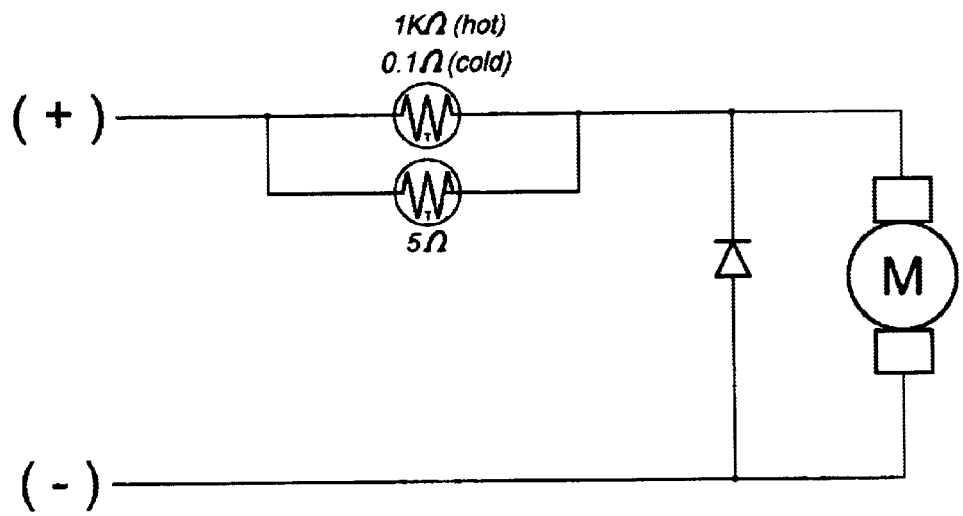
FIG. 11 is an electrical circuit schematic diagram.
Figure 12:
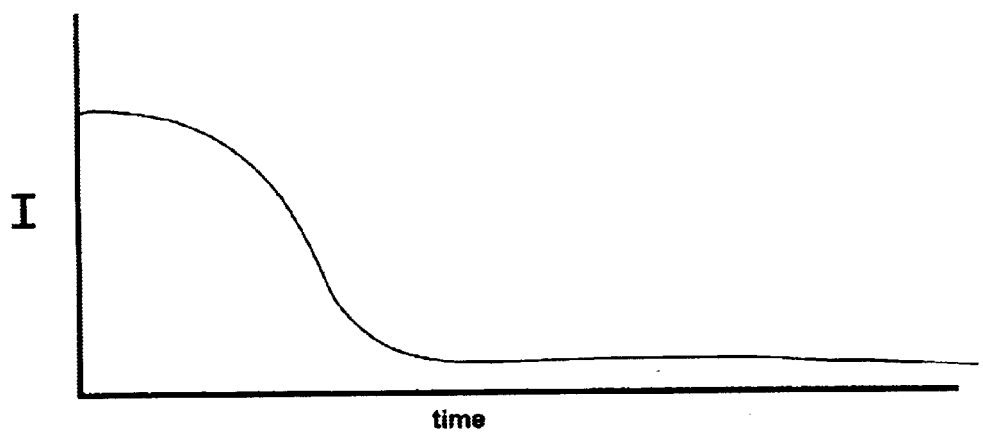
FIG. 12 is a graph of current vs. time illustrating the motor brake effectuation.

FIG. 11 is the electrical schematic diagram for the motor 16. As one of ordinary skill in the art will recognize, a normal motor will heat up under "stall reconditions", such as will occur frequently during the normal operation of the above described invention. This heating up of the motor would prove to be detrimental to the life of the motor. Therefore, in the diagram, the uppermost thermal resistor is a 0.1 ohm resistor during cold operation, so the current will choose this route when it is cold because electricity will follow the path of least resistance. When hot, the resistance increases to 1000 ohms, shifting the electrical path to the five (5) ohm resistor path, which is the lower of the two resistors at that time. The 5 ohm resistance will still leave enough torque in the motor without burning it up in the process. Obviously, similarly smaller and larger resistances are possible to perform the same objective. The diode acts as a motor brake which smooths the return, otherwise it will come back too fast. FIG. 12 is a graphical depiction of the output of current as a function of time when analyzing the electrical circuitry as shown in FIG. 11.

INDUSTRIAL APPLICABILITY

The present invention is industrially applicable in the field of rear-view mirrors, especially ones mounted onto or in motor vehicles. Blind spot mirrors have been proposed by other inventors, but were defective in that they used ineffective motors, such as solenoids, for moving the mirrors between the normal and blind spot viewing positions. Therefore, the present invention finds especial industrial applicability in activating blind-spot alleviating side-mounted rear view mirrors for passenger cars.

What is claimed is:

1. A blind spot alleviating side mounted rearview mirror that temporarily moves the rearview mirror to allow a vehicle driver to momentarily refocus the mirror on a preselected blind spot to provide clear vision of the blind spot while making lane changes or turns, comprising:

a movable mirror base plate to which a mirror is mounted;

an electric motor with a rotational output functioning as a motorized mirror actuator;

an activation means to operate the electric motor in electrical communication with said electric motor;

an extension means connected to the output of the electric motor;

a movable ramp for contacting and riding up and down on the extension means, said movable ramp having at least one angled surface defining a guideway therein;

a T-bar acting as a cam element affixed to the movable mirror base plate, said T-bar also being cammingly communicating within the guideway defined by the movable ramp and being slidably received therein;

a biasing spring for automatically returning the movable mirror base plate to its original position after the blind spot has been viewed, without the need for additional motors;

such that when the electric motor is activated, the extension means becomes extended, thereby lifting the T-bar against the angled surface of the movable ramp, urging the mirror to temporarily refocus on a preselected position for viewing the blind spot.

2. The mirror of claim 1, wherein the entire actuator is within a housing to ward off the outer elements.

3. The mirror of claim 1, wherein the activation means includes a switch on a steering column of a vehicle carrying the mirror.

4. The mirror of claim 1, wherein the activation means includes a switch turned on simultaneously with operating a turn signal of a vehicle carrying the switch.

5. The mirror of claim 1, wherein the movable ramp includes an angled surface including angles of between about 25° and about a 65°.

6. The mirror of claim 5, wherein the movable ramp has an angled surface of about 45°.

7. The mirror of claim 1, wherein the biasing spring includes a beehive spring.

8. The mirror of claim 1, further comprising a timing means for holding the mirror in a position which focuses on the blind sport for a time period of between about one second and about three seconds before the mirror is allowed to return to its original position.

9. The mirror of claim 1, further comprising a hinge mounted on a back plate attached to the mirror for moving the mirror from a normal viewing position to a preselected blind spot viewing position, said hinge being from about 1° to about 10° off vertical.

10. The mirror of claim 9, wherein the hinge is about 7° off vertical.

11. The mirror of claim 1, wherein said electric motor includes a diode acting as a motor brake for preventing vibration.

* * * * *